(12) United States Patent
Yang et al.

(10) Patent No.: US 12,459,112 B2
(45) Date of Patent: Nov. 4, 2025

(54) RIGID-FLEXIBLE COUPLED CONTINUUM ROBOT UNIT AND CONTINUUM ROBOT

(71) Applicant: XI'AN JIAOTONG UNIVERSITY, Shaanxi (CN)

(72) Inventors: Laihao Yang, Shaanxi (CN); Yinchong Peng, Shaanxi (CN); Yu Sun, Shaanxi (CN); Xuefeng Chen, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/899,084

(22) Filed: Sep. 27, 2024

(65) Prior Publication Data
US 2025/0296225 A1 Sep. 25, 2025

(30) Foreign Application Priority Data
Mar. 25, 2024 (CN) .......................... 202410342541.6

(51) Int. Cl.
| | |
|---|---|
| *B25J 9/06* | (2006.01) |
| *B25J 9/00* | (2006.01) |
| *B25J 15/00* | (2006.01) |
| *B25J 19/02* | (2006.01) |

(52) U.S. Cl.
CPC ............. *B25J 9/065* (2013.01); *B25J 9/0015* (2013.01); *B25J 15/0019* (2013.01); *B25J 19/023* (2013.01)

(58) Field of Classification Search
CPC ...... B25J 19/023; B25J 15/0019; B25J 9/108; B25J 9/0015; B25J 9/065
USPC ............................ 74/490.04, 490.05; 901/30
See application file for complete search history.

(56) References Cited

U.S. PATENT DOCUMENTS 5,221,118 A * 6/1993 Koltookian .......... B25J 17/0241
901/29

FOREIGN PATENT DOCUMENTS

| CN | 203875891 U | * | 10/2014 | .......... B25J 19/0029 |
| CN | 115488867 A | * | 12/2022 | .............. B25J 17/02 |
| CN | 115556140 A | * | 1/2023 | ............. B25J 18/005 |

* cited by examiner

*Primary Examiner* — T. Scott Fix

(57) ABSTRACT

Disclosed is a rigid-flexible coupled continuum robot unit and a continuum robot. In the rigid-flexible coupled continuum robot unit, structural unit blocks are staggered and interconnected to constitute an entire manipulator; two ends of a flexible nickel-titanium rod are respectively connected with two adjacent structural unit blocks; a front-end unit block is arranged at a foremost end of the manipulator; and a rear-end unit block is arranged at a rearmost end of the manipulator. When in use, a memory alloy nickel-titanium rod forms a flexible joint, a limiting clamping jaw and a limiting boss form a rigid joint, the two complement each other, after a drive wire applies pressure, the limiting clamping jaw and the limiting boss are in a wrapping relationship, a motion trail of the robot unit is limited, such that the robot unit always rotates around a center of rotation along an arc.

10 Claims, 5 Drawing Sheets

RIGID-FLEXIBLE COUPLED CONTINUUM ROBOT UNIT AND CONTINUUM ROBOT

CROSS-REFERENCE TO RELATED APPLICATION

This application claims priority from the Chinese patent application 2024103425416 filed Mar. 25, 2024, the content of which is incorporated herein in the entirety by reference.

TECHNICAL FIELD

The present disclosure relates to the technical field of continuum robots, in particular to a rigid-flexible coupled continuum robot unit and a continuum robot.

BACKGROUND

As a unique robot type, a continuum robot has attached wide attention. Compared with a traditional rigid robot, the continuum robot has a flexible structure, such that it can bend, curl and stretch, so as to adapt to different working environments and tasks; meanwhile, the continuum robot has multiple degrees of freedom, and deforms flexibly in a three-dimensional space, so as to implement more complicated operations and motions; and with its flexibility, the continuum robot can perform operations in narrow or complicated spaces, can adapt to working environments with different shapes and surfaces, such as medical treatment, rescue search, and aero-engine maintenance, and has wide application potential.

The structural design of the continuum robot directly affects its working performance, more and more people put forward lots of different structural schemes, however, some problems exist, a traditional double-core column continuum robot, for example, a structure used in an invention patent "Wire Drive Continuum Robot" (publication number CN 111168658 A), with its motion deformed to a complicated spline, and prone to generating torsional deformation, cannot bear a larger load. There are also some contact-assisted continuum robot structures, for example, an invention patent "Cam-assisted Flexible Continuum Robot Unit and Robot" (publication number CN 113814966 A) has a cam mechanism arranged in the middle and two spring plates arranged on two sides, but this cam mechanism is mainly intended to limit joint motion trails, for a torsional load, its force bearing point is close to a center position, the arm of force is short, and the torsion resistance capacity is limited. For another example, "Rolling-contact-based Flexible Joint and Continuum Robot having same" (publication number CN 110900651 A), with a spring plate arranged in the middle and rolling body mechanisms arranged on two sides, the rolling body mechanisms do not have contact limit in a torsional peripheral direction, such that the torsion resistance capacity is also limited. In addition, the torsion resistance capacity provided by the spring plates of the above two schemes is not large, and the middle space of a continuum manipulator is occupied, through holes cannot be arranged to arrange operating devices, such as a cable, a camera, a searchlight, a sander or a scalpel, etc., which undoubtedly and greatly weakens the functionality of the continuum robot.

The above information disclosed in the background technology is merely used to enhance the understanding of the background of the present disclosure, and may therefore contain information that does not constitute the prior art known to those ordinarily skilled in the art.

SUMMARY

In order to solve the above problem, the present disclosure provides a rigid-flexible coupled continuum robot unit and a continuum robot. A clamping jaw structure is in contact with a boss structure in a limiting mode, torsion resistance capacity and load bearing capacity are high, and the rigid-flexible coupled continuum robot unit and the continuum robot have the advantages of such as being simple and accurate in kinematical modeling, arranging through holes capable of arranging operating apparatuses in the middle, and being capable of adapting to different environments for operating.

Objectives of the present disclosure are implemented through the following technical solutions. The rigid-flexible coupled continuum robot unit includes:

a plurality of structural unit blocks, connected in series to constitute a manipulator, and each including:
a unit body, including a central operating hole penetrating along a central axis and a flexible rod hole slot and a drive wire through hole arranged in a periphery,
a limiting clamping jaw, extending downwards from a lower surface of the unit body,
a limiting boss, extending upwards from an upper surface of the unit body, and clamped to the limiting clamping jaw of the unit body of another adjacent upper structural unit block in a limiting mode,
a plurality of side slots, recessed inwards from a side surface of the unit body in a direction perpendicular to the central axis, and
a plurality of set threaded holes, arranged on the side surface of the unit body and communicating with the flexible rod hole slot, and staggered with the side slots;
a front-end unit block, arranged at a foremost end of the manipulator, and including:
a unit body, including a central threaded hole penetrating along a central axis and a flexible rod hole slot and a drive wire through hole arranged in a periphery,
a limiting clamping jaw, extending downwards from a lower surface of the unit body of the front-end unit block, and clamped to the limiting boss of the adjacent lower structural unit block in a limiting mode,
a plurality of side slots, recessed inwards from a side surface of the unit body of the front-end unit block in a direction perpendicular to the central axis, and
a plurality of set threaded holes, arranged on the side surface of the unit body of the front-end unit block, communicating with the flexible rod hole slot, and staggered with the side slots, and a flexible nickel-titanium rod being arranged in the flexible rod hole slot of the front-end unit block in a penetrating mode and connected via set screws in the set threaded holes;
a rear-end unit block, arranged at a rearmost end of the manipulator, and including:
a unit body, including a central operating hole penetrating along a central axis and a flexible rod hole slot and a drive wire through hole arranged in a periphery,
a limiting boss, extending upwards from an upper surface of the unit body of the rear-end unit block, and clamped to the limiting clamping jaw of the adjacent upper structural unit block in a limiting mode,
a plurality of side slots, recessed inwards from a side surface of the unit body of the rear-end unit block in a direction perpendicular to the central axis, a plurality of set threaded holes, arranged on the side surface of the unit body of the rear-end unit block, communicating with the flexible rod hole slot, and staggered with the side slots, and a flexible nickel-titanium rod being arranged in the flexible rod hole slot of the rear-end unit block in a penetrating mode and connected via set screws in the set threaded holes, and a connecting chassis, arranged at the bottom of the unit body of the rear-end unit block, and a plurality of second set threaded holes being distributed on the periphery of the connecting chassis; and a plurality of flexible nickel-titanium rods, arranged in the flexible rod hole slot of the unit body in a penetrating mode and connected via set screws in the set threaded holes.

In the rigid-flexible coupled continuum robot unit, the unit body is of a cylinder structure.

In the rigid-flexible coupled continuum robot unit, the front-end unit block is in threaded connection with operating apparatuses via the central threaded hole.

In the rigid-flexible coupled continuum robot unit, the operating apparatuses include a camera, a searchlight, a sander or a scalpel, etc.

In the rigid-flexible coupled continuum robot unit, the rear-end unit block is fixedly connected to a driving control system via the second set threaded holes.

In the rigid-flexible coupled continuum robot unit, the limiting clamping jaw is clamped to a square slot of the limiting boss, and in two adjacent structural unit blocks, an inner side arc surface of the limiting clamping jaw is in a clearance fit with an outer side arc surface of the limiting boss correspondingly and tangentially.

In the rigid-flexible coupled continuum robot unit, two limiting clamping jaws and two limiting bosses are respectively arranged on two sides of the central operating hole, and are staggered in 90° in the same structural unit block in a direction of an axis.

In the rigid-flexible coupled continuum robot unit, a joint is formed between two adjacent structural unit blocks, each joint has a degree of freedom, and the plurality of structural unit blocks are sequentially staggered in 90° in a direction of an axis to form bending steering with multiple degrees of freedom.

In the rigid-flexible coupled continuum robot unit, the front-end unit block, the structural unit blocks and the rear-end unit block are connected in series on the same bent central axis.

A continuum robot includes the rigid-flexible coupled continuum robot unit, a plurality of drive wires sequentially penetrate through the front-end unit block and the structural unit blocks to be connected with drive wire through holes of the rear-end unit block to form the continuum robot.

Compared with the prior art, the present disclosure has the following advantages.

1. The present disclosure adopts a rigid-flexible coupled structure, and adopts a memory metal material nickel-titanium rod as a framework support, thereby improving the softness and flexibility; and adopts a contact-assisted manner, and the clamping jaw and boss of each robot unit are interlocked and wrapped with each other to constitute a rigid connecting joint.

2. At the same time, the present disclosure further has the torsion resistance capacity, due to a rigid connection mode, when torsion will happen, the clamping jaw and the boss are limited by each other, such that the torsion resistance capacity may be greatly improved.

3. At the same time, the present disclosure further has a definite motion trail, the rigid connection mode can limit the motion trail of the robot unit, such that the robot unit rotates around the center of rotation along the arc, and the kinematical modeling is simple and accurate.

4. At the same time, the present disclosure further has a maximum bending angle to prevent overload damage, due to the contact-assisted manner, when the adjacent unit is bent, the tail end of the clamping jaw is in contact with a root of the boss to form the maximum bending angle, so as to prevent flexible joints from being damaged due to excessive load, and meanwhile, the load bearing capacity is also improved.

5. At the same time, the present disclosure is further provided with through holes in the middle to arrange the operating apparatuses, such as the cable, the camera, the searchlight, the sander, and the scalpel, so as to better adapt different environments for operating.

6. At the same time, the present disclosure is further provided with the side slots at the position where the side surfaces of the unit blocks penetrate through wires, such that the contact of the drive wires and block bodies may be reduced, and thus, negative effects of friction are reduced.

The above description is merely an overview of the technical solutions of the present disclosure, in order to make technical means of the present disclosure clearer and more understanding to achieve the degree of implementing by those skilled in the art according to contents of the specification, and in order to make the above and other objectives, features and advantages of the present disclosure more obvious and understandable, illustrations are made below by taking specific implementations of the present disclosure as examples.

BRIEF DESCRIPTION OF DRAWINGS

By reading the detailed descriptions in the following preferred specific implementations, other various advantages and benefits of the present disclosure will become clear for those ordinarily skilled in the art. Description accompanying drawings are merely used to illustrate preferred implementations, and are not considered to limit the present disclosure. Obviously, the accompanying drawings described below are merely some embodiments of the present disclosure, and those ordinarily skilled in the art may further obtain other accompanying drawings according to these accompanying drawings without creative work. In addition, in the entire accompanying drawings, the same accompanying drawing reference numerals represent the same components.

In the accompanying drawings.

Figure 1:
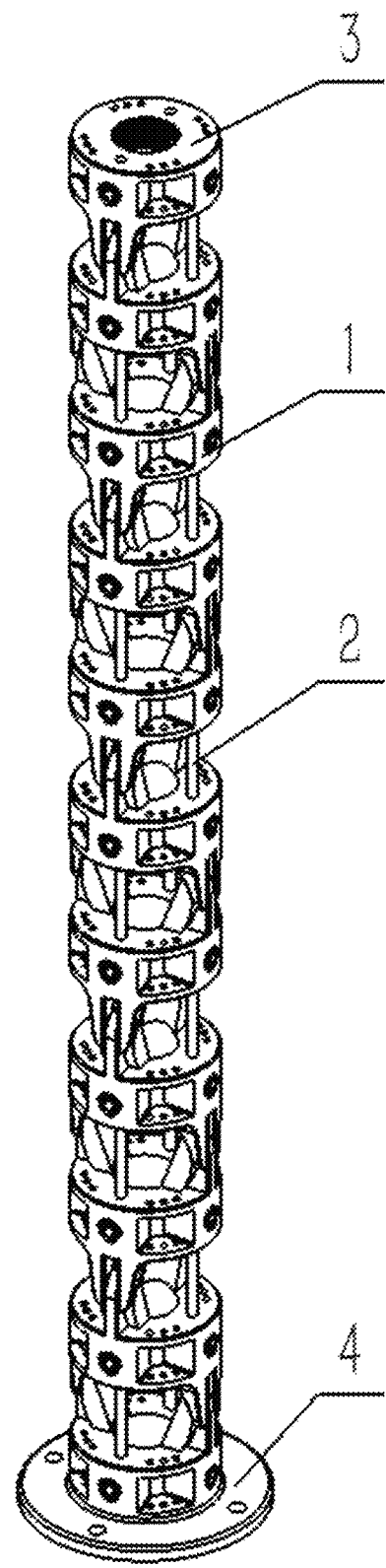
FIG. 1 is a schematic diagram of a rigid-flexible coupled continuum robot unit and a continuum robot of the present disclosure.

The present disclosure is further explained below in conjunction with the accompanying drawings and embodiments.

DETAILED DESCRIPTION OF THE INVENTION

Specific embodiments of the present disclosure will be described in more detail below with reference to accompanying drawings. Although the specific embodiments of the present disclosure are displayed in the accompanying drawings, it should be understood that the present disclosure may be implemented in various forms and should not be limited by the embodiments stated here. On the contrary, these embodiments are provided to make the present disclosure be understood more thoroughly, and to completely convey the scope of the present disclosure to those skilled in the art.

It needs to be noted that some words are used in the specification and claims to refer to specific components. Those skilled in the art should understand that those skilled may use different nouns to call the same component. The specification and claims do not use the difference of nouns as a way of distinguishing components, but use differences of the components on functions as a criterion for distinguishing. For example, "contain" or "include" mentioned in the entire specification and claims is an open phrase, and thus should be explained as "contain but not limited to". The subsequent description of the specification is a preferred implementation for implementing the present disclosure, however, the description is for an objective of general principles of the specification, and is not used to limit the scope of the present disclosure. The scope of protection of the present disclosure should be as defined in the attached claims.

For facilitating understanding the embodiments of the present disclosure, further explanation is made below in conjunction with the accompanying drawings and taking the specific embodiments as examples, and each accompanying drawing does not constitute the limitation to the embodiments of the present disclosure.

For better understanding, as shown in FIG. 1 to FIG. 5, a rigid-flexible coupled continuum robot unit includes structural unit blocks 1, as main structural units of a manipulator, being staggered and interconnected to constitute the entire manipulator; flexible nickel-titanium rods 2, two ends of which being respectively connected with two adjacent structural unit blocks 1, and being connected through flexible rod hole slots 12 and set screws in set threaded holes 16; a front-end unit block 3, arranged at a foremost end of the manipulator; and a rear-end unit block 4, arranged at a rearmost end of the manipulator.

Figure 2:
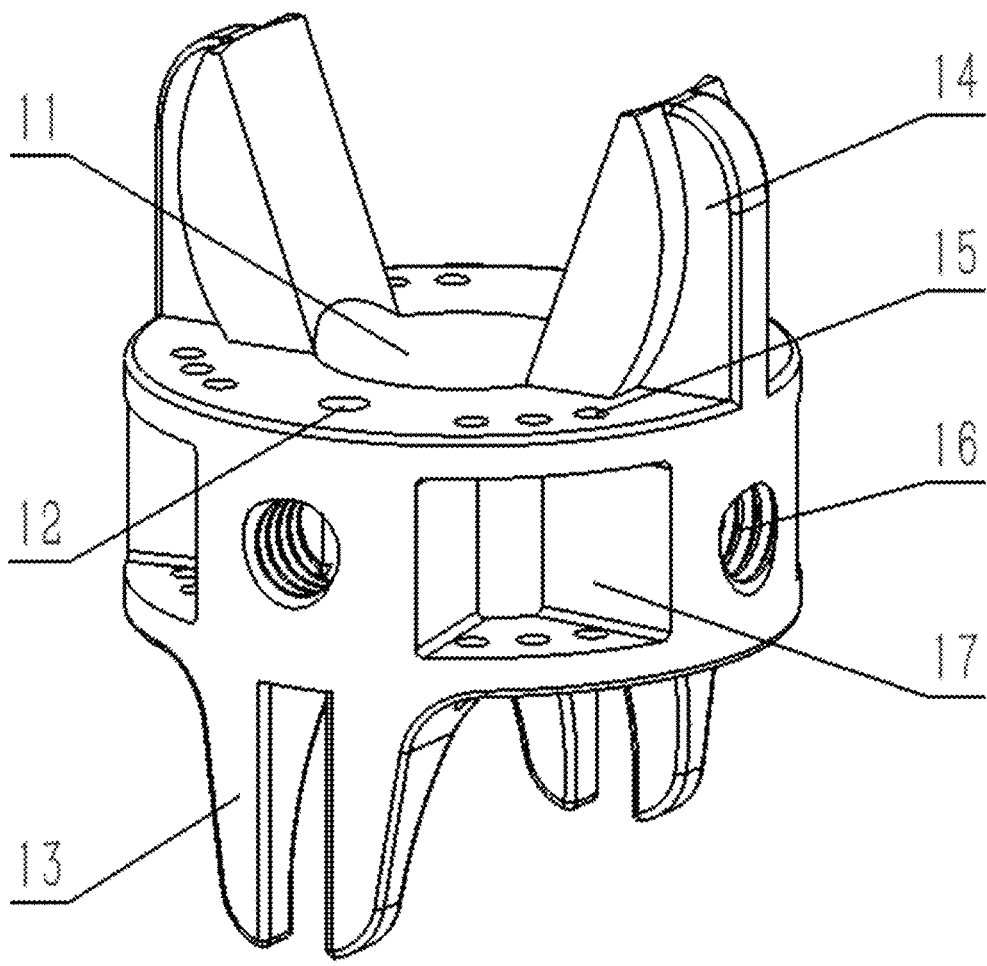
FIG. 2 is a schematic structural diagram of a structural unit block in the present disclosure.

As shown in FIG. 2, each structural unit block 1 includes a central operating hole 11, a flexible rod hole slot 12, a limiting clamping jaw 13, a limiting boss 14, a drive wire through hole 15, a set threaded hole 16 and a side slot 17; the limiting clamping jaw 13 is arranged on a lower surface of the structural unit block 1; the limiting boss 14 is arranged on an upper surface of the structural unit block 1; the limiting clamping jaw 13 is provided with a square slot, and the square slot may be clamped to a boss of the limiting boss 14; in the two adjacent structural unit blocks 1, an inner side arc surface of the limiting clamping jaw 13 is in a clearance fit with an outer side arc surface of the limiting boss 14 correspondingly and tangentially in a wrapping relationship; the two limiting clamping jaws 13 and the two limiting bosses 14 are respectively arranged on two sides of the central operating hole 11, and are staggered in 90° in the same structural unit block 1 in a direction of an axis; the central operating hole 11 is a through hole, and arranged at the center of the structural unit block 1; the drive wire through holes 15 are arranged in the periphery of the central operating hole 11 and penetrate through the structural unit block 1; and set threaded holes 16 and side slots 17 are arranged on side surfaces of the structural unit block 1 in a staggered mode, and the side slots 17 can reduce the contact of the drive wires and the block bodies, so as to reduce the effects of friction.

Figure 3:
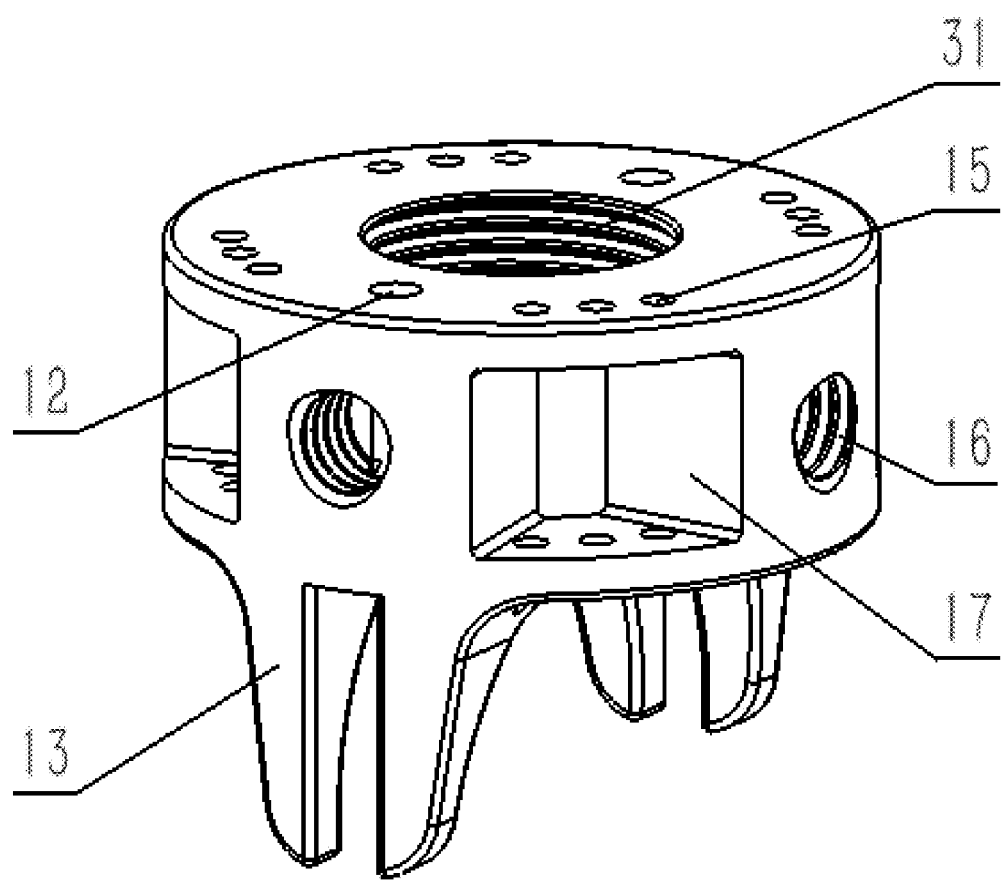
FIG. 3 is a schematic structural diagram of a front-end unit block in the present disclosure.

As shown in FIG. 3, the front-end unit block 3 includes a central threaded hole 31, a flexible rod hole slot 12, a limiting clamping jaw 13, a drive wire through hole 15, a set threaded hole 16 and a side slot 17. The central threaded hole 31 is arranged at the center of the front-end unit block 3 and arranged at a foremost end of the manipulator, and may be connected with the operating apparatuses, such as the camera, the searchlight, the sander, and the scalpel.

Figure 4:
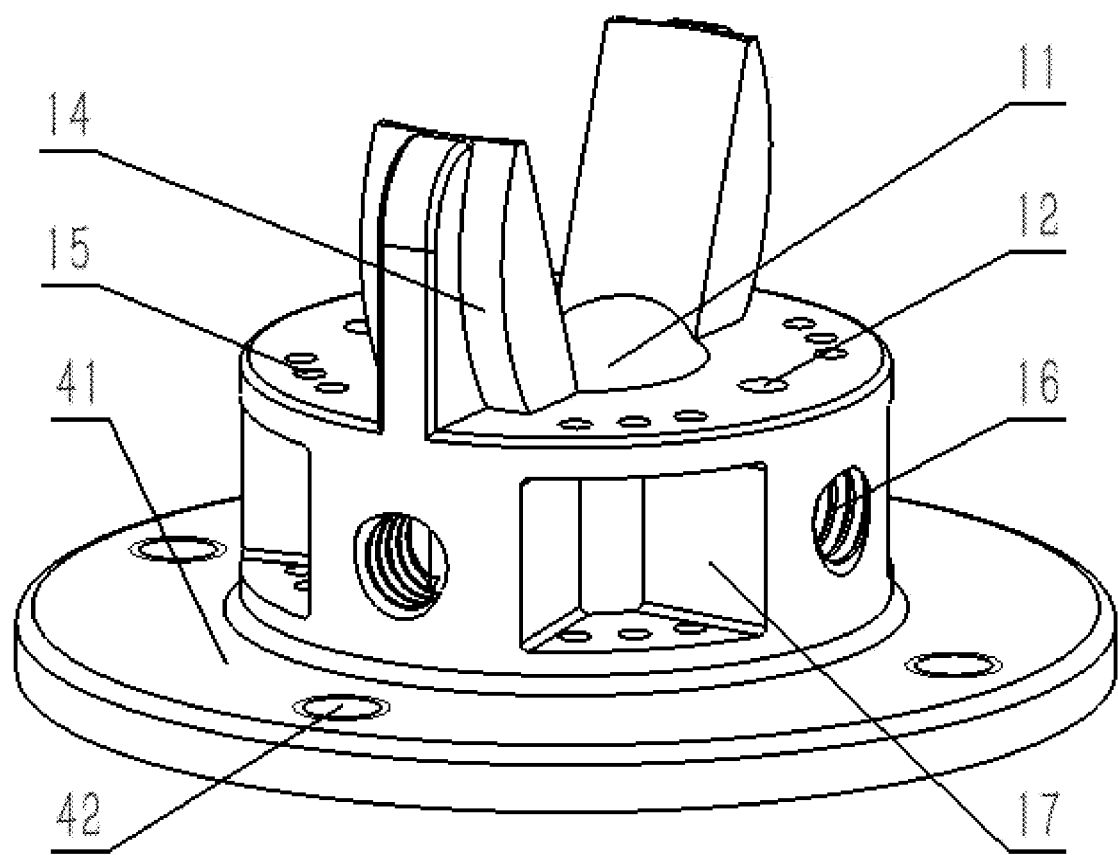
FIG. 4 is a schematic structural diagram of a rear-end unit block in the present disclosure.

As shown in FIG. 4, the rear-end unit block 4 includes a connecting chassis 41, second set threaded holes 42, a central operating hole 11, flexible rod hole slots 12, a limiting boss 14, drive wire through holes 15, set threaded holes 16 and side slots 17; and the rear-end unit block 4 is arranged at a rearmost end of the manipulator, and four second set threaded holes 42 are arranged in the connecting chassis 41, so as to connect and fix the manipulator and a driving control system.

Figure 5:
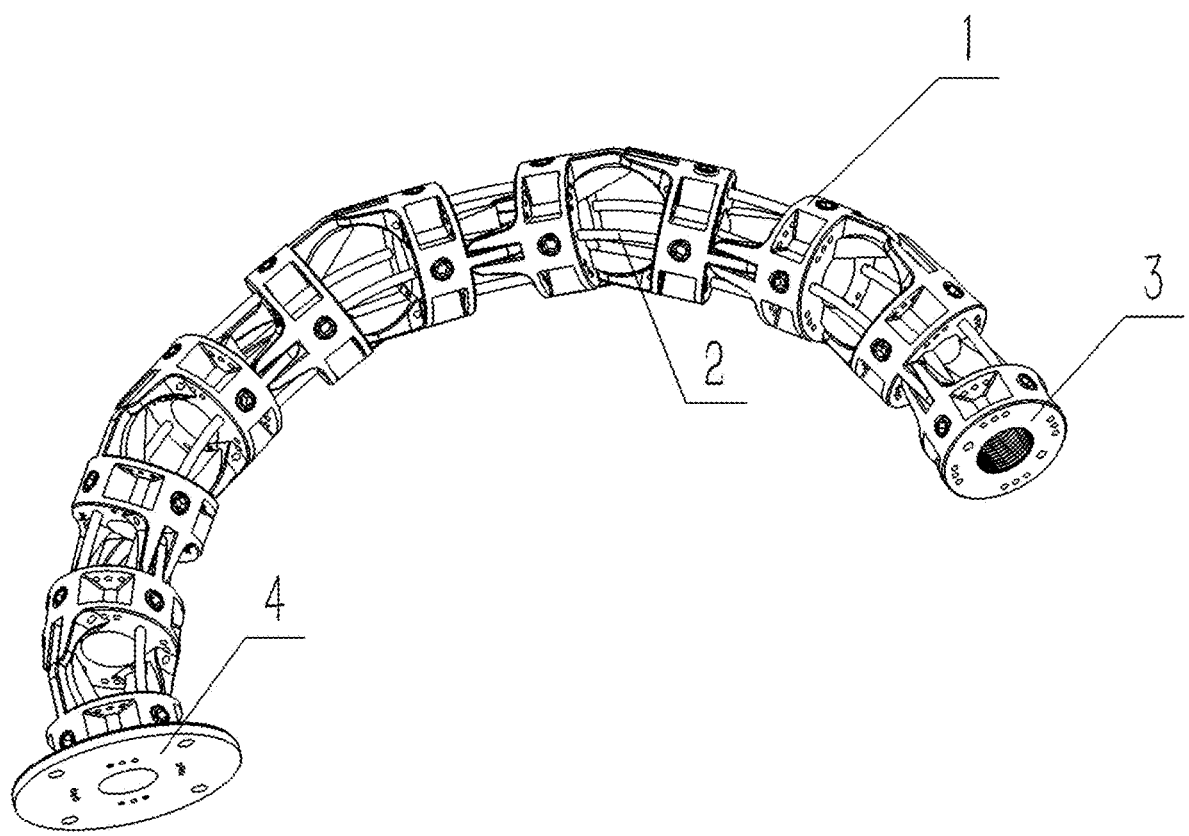
FIG. 5 is a schematic diagram of a continuum robot after deformation of the present disclosure.

As shown in FIG. 5, when the rigid-flexible coupled continuum robot unit works, the drive wires apply force to make the structural unit blocks 1 of the robot be pressed and rotate, and the flexible nickel-titanium rods 2 are pressed and deformed, and is in a state that the entire manipulator is bent.

In an embodiment, the rigid-flexible coupled continuum robot unit includes structural unit blocks 1, flexible nickel-titanium rods 2, a front-end unit block 3 and a rear-end unit block 4, a joint is formed between every two adjacent unit blocks, each joint has a degree of freedom, the plurality of structural unit blocks 1 are sequentially staggered with each other in 90° in a direction of an axis, such that bending steering with multiple degrees of freedom is formed, and a plurality of drive wires sequentially penetrate through drive wire through holes 15. When the drive wires are pulled, each unit block is pressed, the entire continuum manipulator is bent and deformed, the flexible part: the flexible nickel-titanium rods 2 are pressed and deformed, and as a memory alloy, have good springback capacity; and the rigid part: an inner side arc surface of the limiting clamping jaw 13 is in a clearance fit with an outer side arc surface of the limiting boss 14 correspondingly and tangentially in a wrapping relationship, the motion trail of the robot unit can be limited, such that the robot unit always rotate around the center of rotation along the arc, the kinematical modeling is simpler and more accurate, and the rigid part and the flexible part complement each other to form a rigid-flexible coupled mechanism.

The limiting clamping jaw 13 is provided with a square slot, the square slot may be clamped to a boss of the limiting boss 14, when torsion will happen, the clamping jaw and the boss are limited by each other, and thus, the torsion resistance capacity may be greatly improved; and meanwhile, when the adjacent units are bent, the tail end of the clamping jaw is in contact with a root of the boss to form the maximum bending angle, so as to prevent flexible joints from being damaged due to excessive load, and meanwhile, the load bearing capacity is also improved.

The manipulator needs to be bent and deformed in different working environments according to task objectives, so as to form a needed shape, and then needed tools are arranged in the central operating hole 11 according to task requirements, such as a camera, a searchlight, a sander, a scalpel and other apparatuses and a cable for supplying power or transmitting a signal, so as to complete the task objectives.

In an embodiment, a rigid-flexible coupled continuum robot unit and a continuum robot include:
structural unit blocks 1, staggered and interconnected to constitute the entire manipulator;
flexible nickel-titanium rods 2, two ends of which being respectively connected with two adjacent structural unit blocks 1;
a front-end unit block 3, arranged at a foremost end of the manipulator; and
a rear-end unit block 4, arranged at a rearmost end of the manipulator.

Each structural unit block 1 includes a central operating hole 11, a flexible rod hole slot 12, a limiting clamping jaw 13, a limiting boss 14, a drive wire through hole 15, a set threaded hole 16 and a side slot 17; the limiting clamping jaw 13 is arranged on a lower surface of the structural unit block 1; the limiting boss 14 is arranged on an upper surface of the structural unit block 1; the central operating hole 11 is a through hole, and arranged at the center of the structural unit block 1; the drive wire through holes 15 are arranged in the periphery of the central operating hole 11 and penetrate through the structural unit block 1; and set threaded holes 16 and side slots 17 are arranged on side surfaces of the structural unit block 1 in a staggered mode. Flexible nickel-titanium rods 2 are arranged between the two adjacent structural unit blocks 1, and connected through the flexible rod hole slot 12 and set screws in the set threaded holes 16. The front-end unit block 3 includes a central threaded hole 31, a flexible rod hole slot 12, a limiting clamping jaw 13, a drive wire through hole 15, a set threaded hole 16, and a side slot 17; and the central threaded hole 31 is arranged at the center of the front-end unit block 3 and arranged at the foremost end of the manipulator, and may be connected with the operating apparatuses such as a camera, a searchlight, a sander or a scalpel. The rear-end unit block 4 includes a connecting chassis 41, a second set threaded hole 42, a central operating hole 11, a flexible rod hole slot 12, a limiting boss 14, a drive wire through hole 15, a set threaded hole 16 and a side slot 17; and the rear-end unit block 4 is arranged at the rearmost end of the manipulator, four second set threaded holes 42 are arranged in the connecting chassis 41, and the manipulator and a driving control system may be connected and fixed. The limiting clamping jaw 13 is provided with a square slot, and the square slot may be clamped to a boss of the limiting boss 14; and in two adjacent structural unit blocks 1, an inner side arc surface of the limiting clamping jaw 13 is in a clearance fit with an outer side arc surface of the limiting boss 14 correspondingly and tangentially in a wrapping relationship. The two limiting clamping jaws 13 and the two limiting bosses 14 are respectively arranged on two sides of the central operating hole 11, and are staggered in 90° in the same structural unit block 1 in a direction of an axis. A joint is formed between every two adjacent unit blocks, each joint has a degree of freedom, the plurality of structural unit blocks 1 are sequentially staggered with each other in 90° in a direction of an axis, such that bending steering with multiple degrees of freedom is formed, and a plurality of drive wires sequentially penetrate through drive wire through holes 15, and connected to form the continuum robot.

Basic principles of the present application are described above in conjunction with specific embodiments, however, it needs to be noted that merits, advantages, effects, etc. mentioned in the present application are merely illustrative but not limitation, and it should not be considered that these merits, advantages, effects, etc. are necessary for the embodiments of the present application. In addition, the above disclosed specific details are merely for the action of illustration and the action of understanding, not limitation, and the above details do not limit the present application to need to adopt the above specific details for implementation.

The above description has been already given for objectives of illustration and description. In addition, the description is not intended to limit the embodiments of the present application to the form disclosed herein. Although the plurality of embodiments have been already discussed above, those skilled in the art will know various forms such as some deformations, modifications, additions and sub-combinations, as revealed in the specification and without departing from the scope of protection of the claims of the present disclosure, all of which fall within the protection of the present disclosure.

The invention claimed is:

1. A rigid-flexible coupled continuum robot unit, comprising:
a plurality of structural unit blocks, connected in series to constitute a manipulator, and each structural unit block comprising:
a first unit body, comprising a first central operating hole penetrating along a first central axis and a first flexible rod hole slot and a first drive wire through hole arranged in a first periphery,
a first limiting clamping jaw, extending downwards from a first lower surface of the first unit body,
a first limiting boss, extending upwards from an upper surface of the unit body, and clamped to the first limiting clamping jaw of a second unit body of another adjacent upper structural unit block in a first limiting mode,
a plurality of first side slots, recessed inwards from a side surface of the first unit body in a direction perpendicular to the first central axis, and
a plurality of first set threaded holes, arranged on the side surface of the first unit body and communicating with the first flexible rod hole slot, and staggered with the first side slots;
a front-end unit block, arranged at a foremost end of the manipulator, and comprising:
a third unit body, comprising a central threaded hole penetrating along a second central axis and a second flexible rod hole slot and a second drive wire through hole arranged in a second periphery,
a second limiting clamping jaw, extending downwards from a second lower surface of the third unit body of the front-end unit block, and clamped to a second limiting boss of an adjacent lower structural unit block in a second limiting mode,
a plurality of second side slots, recessed inwards from a side surface of the third unit body of the front-end unit block in a direction perpendicular to the second central axis, and
a plurality of second set threaded holes, arranged on the side surface of the third unit body of the front-end unit block, communicating with the second flexible rod hole slot, and staggered with the second side slots, and a first flexible nickel-titanium rod being arranged in the second flexible rod hole slot of the front-end unit block in a penetrating mode and connected via set screws in the second plurality of the set threaded holes;

a rear-end unit block, arranged at a rearmost end of the manipulator, and comprising:
a fourth unit body, comprising a second central operating hole penetrating along a third central axis and a third flexible rod hole slot and a third drive wire through hole arranged in a third periphery,
a third limiting boss, extending upwards from an upper surface of the fourth unit body of the rear-end unit block, and clamped to a third limiting clamping jaw of the another adjacent upper structural unit block in a third limiting mode,
a plurality of third side slots, recessed inwards from a side surface of the fourth unit body of the rear-end unit block in a direction perpendicular to the third central axis,
a plurality of third set threaded holes, arranged on the side surface of the fourth unit body of the rear-end unit block, communicating with the third flexible rod hole slot, and staggered with the third side slots, and
a connecting chassis, arranged at the bottom of the fourth unit body of the rear-end unit block, and a plurality of fourth set threaded holes being distributed on the periphery of the connecting chassis;
a second flexible nickel-titanium rods, arranged in the flexible rod hole slot of the fourth unit body in a penetrating mode and connected via set screws in the fourth set threaded holes; and
the first limiting clamping jaw is clamped to a square slot of the first limiting boss, and in two adjacent structural unit blocks, an inner side arc surface of the first limiting clamping jaw is in a clearance fit with an outer side arc surface of the first limiting boss correspondingly and tangentially.

2. The rigid-flexible coupled continuum robot unit according to claim 1, wherein, each of the first, second, third, and fourth unit bodies is of a cylinder structure.

3. The rigid-flexible coupled continuum robot unit according to claim 1, wherein, the front-end unit block is in threaded connection with operating apparatuses via the central threaded hole.

4. The rigid-flexible coupled continuum robot unit according to claim 3, wherein, the operating apparatuses comprise a camera, a searchlight, a sander or a scalpel.

5. The rigid-flexible coupled continuum robot unit according to claim 1, wherein, the rear-end unit block is fixedly connected with a driving control system via the fourth set threaded holes.

6. A continuum robot, comprising the rigid-flexible coupled continuum robot unit according to claim 1, wherein, a plurality of drive lines sequentially penetrates through the front-end unit block and structural unit blocks to be connected with the rear-end unit block to form the continuum robot.

7. The continuum robot of claim 6, wherein the unit body is of a cylinder structure.

8. The continuum robot of claim 6, wherein the front-end unit block is in threaded connection with operating apparatuses via the central threaded hole.

9. The continuum robot of claim 8, wherein the operating apparatuses comprise a camera, a searchlight, a sander or a scalpel.

10. The continuum robot of claim 6, wherein the rear-end unit block is fixedly connected with a driving control system via the fourth set threaded holes.

* * * * *